July 28, 1953  J. C. CLARK  2,647,243
SOCKET FOR PLUG-IN TYPE ELECTRIC METERS
Filed July 7, 1950

Inventor
John C. Clark
By John N. Randolph
Attorney

Patented July 28, 1953

2,647,243

UNITED STATES PATENT OFFICE 2,647,243

SOCKET FOR PLUG-IN TYPE ELECTRIC METERS

John C. Clark, Marshall, Tex.

Application July 7, 1950, Serial No. 172,583

4 Claims. (Cl. 339—31)

1

This invention relates to an improved construction of socket for use with conventional watthour meters of the detachable plug in type and has for its primary object to provide a socket or base for electric meters which may be quickly and easily adjusted so that the socket may be mounted either in a normal position with the electric conduit hubs in vertical alignment or by a simple adjustment the socket or base may be mounted with the conduit hubs in horizontal alignment but with the other parts disposed so that a plug in meter will be disposed in the same position as when the hubs are in vertical alignment.

Still another object of the invention is to provide a meter socket or base of extremely simple construction capable of being very economically manufactured and sold, which will be extremely efficient and durable for accomplishing its intended purpose.

Still another object of the invention is to provide a meter socket or base having a ground connection which may likewise be adjustably disposed relatively to the socket hubs, so that said ground connection can be most conveniently positioned for connection to the ground wire extending into the shell of the socket or for connection to a common ground wire where a number of meter sockets are grouped together.

Various other objects and advantages of the invention will hereinafter become more fully apparent from the following description of the drawing, illustrating a presently preferred embodiment thereof, and wherein.

Figure 1:
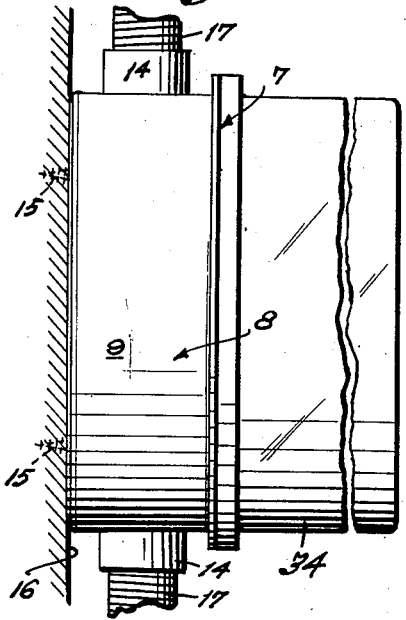
Figure 1 is an edge elevational view showing the meter socket or base in a normal applied position and having a conventional plug in type meter connected thereto.

Referring more specifically to the drawing, the meter socket or base in its entirety is designated generally 7 and includes a shell, designated generally 8 which is substantially cup-shaped having an annular wall 9, a closed rear side or back

Figure 2:
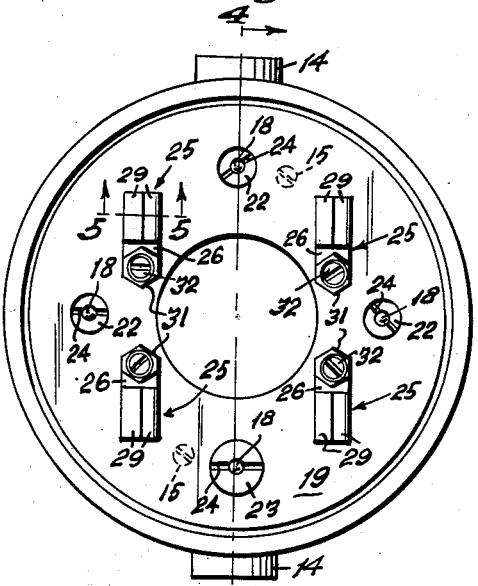
Figure 2 is a front elevational view thereof, with the meter removed, looking from right to left of Figure 1.

2 wall 10, which is formed integral with the annular wall 9 and an open front side 11 which is surrounded by an annular outturned flange 12, forming an outturned continuation of one side edge of the annular wall 9. The annular wall 9 is provided with diametrically opposed openings 13 and an electrical conduit receiving hub or sleeve 14 is secured to the outer side of the wall 9 around each opening 13 and is preferably swedged in or otherwise secured to form a watertight connection around each of the openings 13. The shell or case 8 may be formed of any suitable metal which is capable of bending without breaking and which is relatively light in weight yet strong, such as sheet aluminum, and the rear wall thereof is provided with a plurality of openings for receiving headed driven fastenings which extend outwardly therethrough, as seen at 15, and by means of which the shell 9 may be secured to an upright supporting surface, as illustrated in Figure 1 at 16. The shell 8 is usually mounted with the hubs 14 in upright positions or in vertical alignment, as illustrated in Figures 1 and 2. Each of the hubs 14 is adapted to receive and anchor an end of an electrical conduit which conduits 17 contain wiring, not shown, to be connected to the clip posts, as will hereinafter be described. The rear wall 10 of the shell 8 has four equally spaced threaded studs 18 extending inwardly therefrom, which studs are circumferentially spaced with respect to one another.

Figure 3:
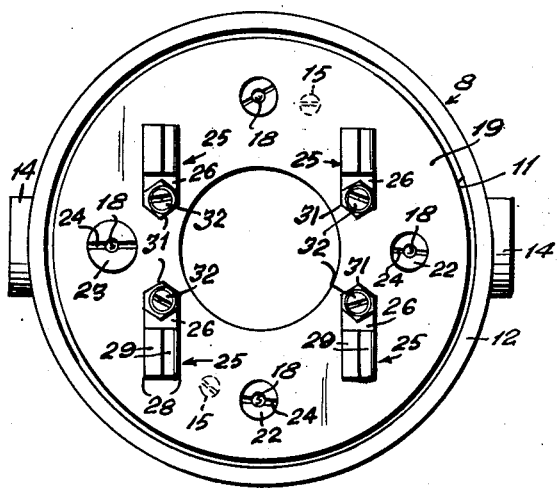
Figure 3 is a view similar to Figure 2 but showing the terminal block rotated through an arc of 90° for positioning the socket clips transversely of the hubs.
Figure 4:
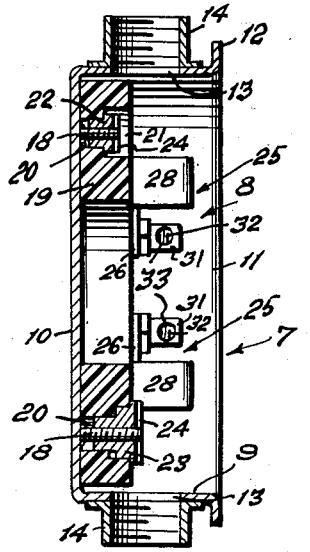
Figure 4 is a longitudinal or diametric sectional view taken substantially along a plane as indicated by the line 4—4 of Figure 2.
Figure 5:
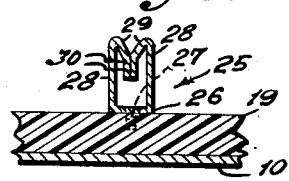
Figure 5 is a fragmentary sectional view taken transversely through one of the socket clips.

The meter socket or base 7 also includes an annular terminal block, designated generally 19, formed of "Bakelite" or other suitable electrical insulating material and which is relatively wide radially from the wall of its bore to its periphery, as illustrated in Figures 2 and 3. The terminal or clip block 19 is provided with four equally spaced openings 20 into which the studs 18 project and each of which is provided with an enlarged portion adjacent the outer surface of the block 19, as seen at 21. Three of the openings 20 are adapted to receive corresponding nuts 22 which threadedly engage the studs 18 which extend into said openings and which are provided with enlarged heads which are countersunk in the enlargements 21 and abut the beds thereof for securing the block 19 to the rear wall 10 of the shell 8. The block 19 is also held in place by a larger nut 23 having a flared head portion of a diameter larger than the flared portions 21 of the openings and which flared head engages the outer face of the block 19. The nut 23 is adapted to be employed with the stud 18 which it engages to form a post for connecting a ground wire, not shown, to the meter base shell 8. Each of the nuts 22 and 23 is provided with a screw driver blade receiving kerf 24 by which it may be applied or removed with a conventional screw driver.

Four corresponding meter prong receiving clips, each designated generally 25, are mounted on the outer or front face of the terminal block 19, said clips 25 each being of integral construction and each including an elongated base 26 through which extends a driven fastening 27 by which the clip 25 is secured to the block 19. Each clip 25 has a pair of corresponding resilient jaws 28 formed integral with and projecting perpendicularly from the side edges of one end of the base 26. The jaws 28 are provided with inwardly turned back free end portions 29 which are disposed in downwardly converging relationship and which terminate in normally abutting terminal portions 30. The portions 29 are adapted to guide a meter prong, not shown, into position between the jaw portions 30 which are yieldably forced thereby away from one another for gripping a meter prong therebetween. Each clip base 26 at its opposite end is provided with an upstanding terminal post 31 which is likewise formed integral therewith and which is internally threaded to receive a conductor wire retaining screw 32 and which is provided with diametrically aligned openings 33 through which an electric wire or wires may be inserted with the screw 32 retracted and clamped to the post 31 by thereafter advancing and tightening its screw 32.

As illustrated in Figure 2, the block 19 is mounted so that the longitudinal axes of the clips 25 are disposed parallel to the axis of the hubs 14 and which is the conventional assembly of the meter socket or base 7 for "vertical" installation, as illustrated in Figures 1 and 2. When thus disposed, a conventional plug type watt-hour meter 34 may be plugged in to the socket 7 by the prongs thereof, not shown, each engaging between the jaws 28 of one of the clips 25 and the meter 34 will then be disposed so that the indicia thereof will be correctly positioned to be read. However, it is necessary in multiple installations and at certain other times, to mount the meter socket 7 with the hubs 14 in a horizontal plane rather than in a vertical plane. When this occurs, in order to mount the meter 34 so that the indicia thereon will be in a proper position to be read, it is only necessary to remove the three nuts 22 and the nut 23, disengage the terminal block 19 from the studs 18, rotate the terminal block in either direction through an arc of 90° and re-apply to the studs 18 and replace the nuts 22 and 23 and the meter socket has thus been adjusted so that the clips 25 will still be disposed in upright positions, as seen in Figure 3, but with their longitudinal axes transverse to the axis of the hubs 14. Accordingly, when the meter 34 is applied to the clips 25 it will still be in the same position as when the hubs 14 are in vertical alignment. The large ground wire securing nut 23 may be connected to any one of the studs 18, one of which is always conveniently disposed for connection to the ground wire of the meter base 7 or to a common ground wire connecting a group of meter bases.

Various modifications and changes are contemplated and may obviously be resorted to, without departing from the spirit or scope of the invention as hereinafter defined by the appended claims.

I claim as my invention:

1. A meter socket for plug in type electric meters comprising a shell having a rear wall and an open side, said shell having an outer wall provided with a pair of aligned conductor receiving openings, an annular terminal block of electrical insulating material loosely disposed in said shell, fastening means anchored to the rear wall of the shell and detachably connected to the block for detachably securing the block in the shell and against said rear wall, said fastening means including a pair of fastenings disposed in alignment with the conductor receiving openings and a pair of aligned fastenings disposed at right angles to the aligned conductor receiving openings, and a plurality of meter prong engaging clips immovably secured to said terminal block and projecting therefrom toward the open side of the shell, said terminal block being rotatable in said shell when disengaged from said fastenings for positioning the clips either parallel to or at a right angle to the axis of said openings of the outer wall.

2. A meter socket as in claim 1, each of said fastenings including a threaded stud projecting inwardly from the rear wall of the shell and a nut detachably engaging said fastening and abutting a portion of the terminal block for securing the terminal block in said shell and against said rear wall, each of said studs being equally spaced from one another and from the center of the shell.

3. A meter socket as in claim 1, each of said prong receiving clips comprising an elongated base secured against a side of the terminal block having integral resilient jaws projecting outwardly from its side edges at one end of the base, said jaws being spring biased toward one another, and an integral terminal post projecting from the opposite end of each clip base, said terminal posts and clip jaws being disposed perpendicular to the plane of the terminal block.

4. A meter socket as in claim 1, said bases of the clips being disposed paralleled and said terminal posts being located at the inner ends of the bases relatively to the centers of the block and shell and on either side of and parallel to the axis of the conductor receiving openings.

JOHN C. CLARK.

References Cited in the file of this patent

UNITED STATES PATENTS

| Number | Name | Date |
|---|---|---|
| 1,350,444 | Rustice | Aug. 24, 1920 |
| 2,066,300 | Mylius | Dec. 29, 1936 |
| 2,427,965 | Henderson | Sept. 23, 1947 |
| 2,457,119 | Bour | Dec. 28, 1948 |
| 2,538,912 | Road et al. | Jan. 23, 1951 |
| 2,542,609 | Wyglendowski | Feb. 20, 1951 |